INVENTORS:
VINCENT J. GREBE, JOHN A. PRIOLETTI,
PAUL W. ROESKE, ALEX VARY

INVENTORS:
VINCENT J. GREBE, JOHN A. PRIOLETTI,
PAUL W. ROESKE, ALEX VARY

INVENTORS
VINCENT J. GREBE, JOHN A. PRIOLETTI,
PAUL W. ROESKE, ALEX VARY

United States Patent Office 3,326,043
Patented June 20, 1967

3,326,043
INDUCTIVE LIQUID LEVEL DETECTION
SYSTEM
Paul W. Roeske, Detroit, Mich., and Alex Vary, North
Olmsted, Vincent J. Grebe, Seven Hills, and John A.
Prioletti, Brookpark, Ohio, assignors to the United States
of America as represented by the Administrator of
the National Aeronautics and Space Administration
Filed Mar. 10, 1965, Ser. No. 438,797
14 Claims. (Cl. 73—290)

ABSTRACT OF THE DISCLOSURE

Axially aligned coils surround a tubular container. The self-inductance of each coil changes as a conductive liquid column fills the tubular spaces within the coils. The self-inductance of each coil is sequentially compared with that of a reference coil.

The invention described herein may be manufactured and used by or for the Government of the United States of America for governmental purposes without the payment of any royalties thereon or therefor.

The present invention relates generally to the determination of liquid levels and relates more specifically to a method and apparatus for detecting the position of and variations in the liquid level of a conductive fluid in a closed, opaque container.

Many of the present prior liquid level indicating systems have the same general disadvantages. Most are slow responding to variations in the liquid level detected. They also provide poor resolution of the position of the liquid interface within a particular segment of the containing vessel. Finally, most have very poor control capability when interlocked in a complex control system.

In addition to the above general disadvantages, the prior liquid level determining devices have disadvantages which are inherent in their construction. For example, one prior liquid level determining device comprises electrical contact probes which sense liquid level changes by completing electrical circuits. These electrical contact probes must penetrate into the containing vessel and are affected by the conductance of liquid metal vapors. In addition, they are subject directly to corrosive attack by highly corrosive materials. There are also resistance probes which sense liquid level changes through resistance changes. These also must penetrate into the vessel and are unduly sensitive to variations in temperature. Radioactive devices detect liquid levels by employing high energy radiation to which the containing vessel is transparent. These radioactive devices are slow responding to changes in liquid level and have poor resolving capabilities. Sonic devices are also provided and depend on the reflection or transmission of sonic vibrations. These sonic devices also require penetrations into the container, are difficult to calibrate, and require elaborate arrangements for sending and receiving signals. Prior self- or mutual-inductance probes which utilize changes in magnetoelectric properties are also used to sense changes in level. These inductance probes require penetrations into the chamber and usually require such fine geometrical configurations that they are adversely affected by lead inductances and high temperatures.

In the present apparatus, a tubular container is provided which is suitable for containing the particular liquid metal or other liquid the level of which is to be determined and continuously sensed. A plurality of inductor coils are arranged in axial alignment and coaxially with the tubular container so that each coil corresponds to a particular tubular segment of the container. The tubular container is orientated so that the liquid metal will form a liquid column filling at least some of the tubular segments. As the conductive liquid fills the tubular spaces within the coils, their self-inductance changes.

One coil which will generally always have the same self-inductance is used as a reference coil for comparison to the self-inductance of the remaining coils which are test coils. Suitable apparatus is provided for sequentially comparing each of the test coils to the reference coil. Indicating circuits, one corresponding to each of the test coils, are provided. As each test coil is examined, its corresponding indicator circuit is energized if the inductance comparison determines that the liquid fills the particular segment defined by that coil by more than a predetermined amount. A holding circuit is provided to maintain the indicator circuits energized during a scanning cycle so that the liquid level is indicated pictorially by the energization circuits, particularly if they have indicators arranged in a vertical line at intervals corresponding to the tubular segments associated with the test coils. The sequential examination of the inductance of each of the test coils is continuously repeated until the system is shut off or until a suitable switching device is actuated to place a selected coil in an incremental readout circuit for determining the height of the liquid level within that particular segment alone. At the introduction of the incremental readout circuit, the cyclic sequential scanning of the remaining inductance coil stops and the entire system is shut down until after the incremental determination of liquid level within the selected coil has been accomplished.

The present system has the advantage that penetrations into the containing vessel are not required. The system is not affected by metal vapors. The inductance coils are not subject to corrosive attack because they can be protected by suitable encasement or by the containing vessel when the coils are disposed around the outside of the vessel. In addition, good resolution is provided by the present system and can be designed for the needs of each application by selecting the proper number of coils. Further, the present system is relatively insensitive to fluctuations in temperature since the inductances of the coils are not affected appreciably by changes in temperatures of the conductive liquid within its core space.

Accordingly, an object of the present invention is to provide a new and improved apparatus for determining the presence of fluids within a container.

Another object of the present invention is to provide a new and improved apparatus for determining liquid level within a containing vessel and for providing a continuous indication of variations in that liquid level.

Still another object of the present invention is to provide a new and improved system for indicating levels of liquids of high temperature, particularly those of a corrosive nature.

Yet another object of the present invention is to provide a new and improved system for determining the level of a conductive liquid within a necessary opaque container and providing a continuous visual indication of that liquid level and any variations in the liquid level.

A further object of the present invention is to provide a new and improved method of determining the presence of a fluid within a vessel.

Other objects and a fuller understanding of the invention may be had by referring to the following description and claims taken in conjunction with the accompanying drawings in which:

Figures 1, 2:
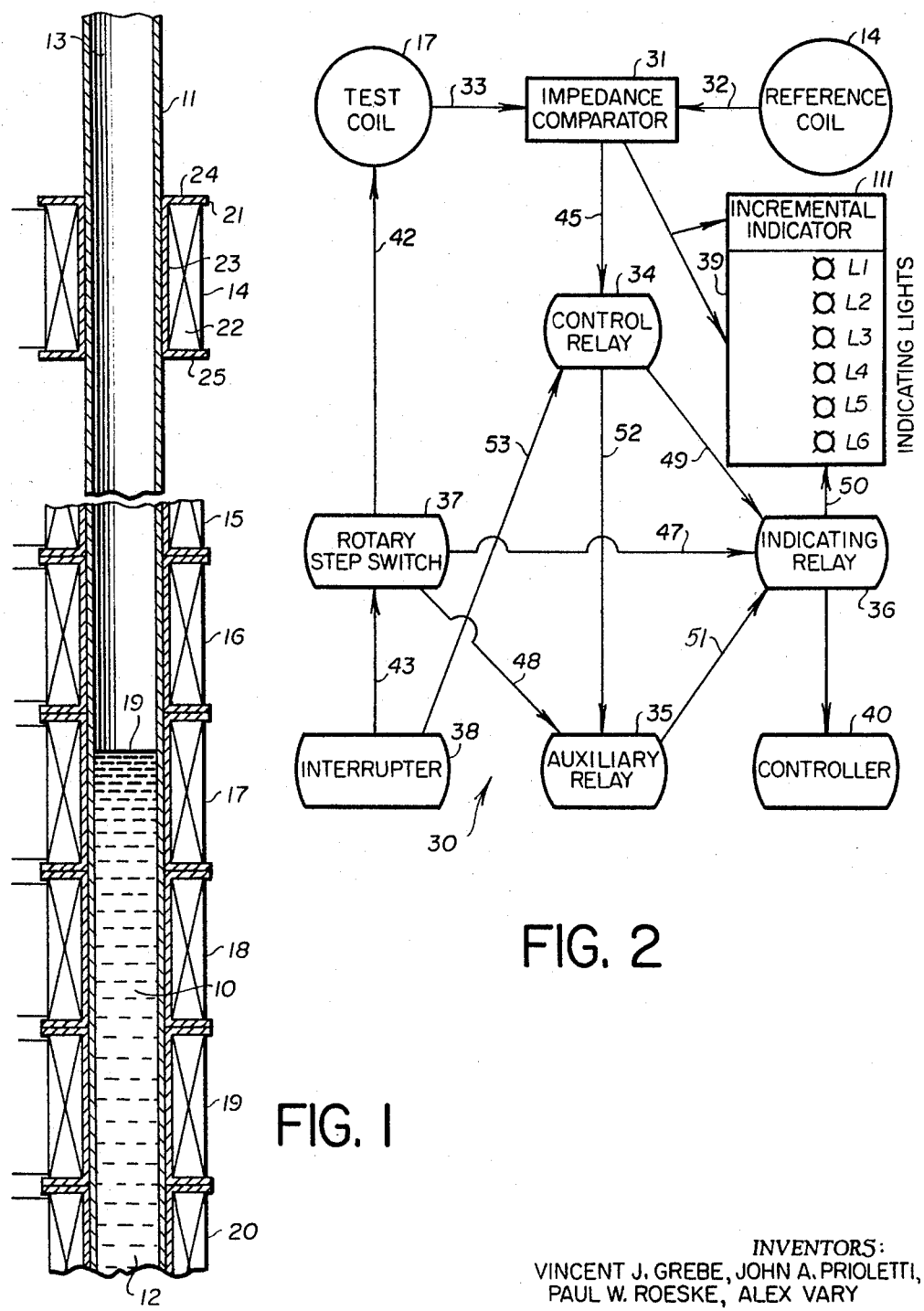
FIGURE 1 is an elevational view, in longitudinal cross-section showing the relative arrangement of a tubular container and the reference and testing coils utilized in the present apparatus.
FIGURE 2 is a block daigram of a control system of the present invention.

Referring now to the drawing, a liquid sensing unit is provided which includes a tubular container 11 and a plurality of sensing or testing coils 14–20. The present sensing unit is intended for operation with any conductive liquid and is particularly suitable for liquid alkali metals. A liquid column 10 shown filling the portions of container 11 that are surrounded by coil assemblies 17–20. The tubular container 11 is an elongated cylindrical tube of a material suitable for the liquid 10 whose level is to be sensed and indicated. The material for the tubular container 11 may be any one of a number of different materials, metallic and non-metallic, depending upon the requirements dictated by the type of liquid 10 whose level is to be sensed. As an example, in operational tests run with mercury at temperatures ranging from 70° to 600° F., the tubular container material was stainless steel and HS25, a high strength, corrosion resistant alloy.

The tubular container has a lower outlet end opening 12 and an upper inlet end opening 13 which will be in communication with a large vessel or a closed loop containing more of the liquid. The tubular container is disposed preferably in a vertical position on the vessel such that the liquid level within the vessel will always be disposed between the outlet and inlet ends 12, 13 of the tubular container 11 in a manner similar to water level indicators for hot water boilers. An interface 19 of the liquid column is therefore disposed between the ends 12, 13 of the tubular container 11.

The size of the tubular container 11 will also vary with the particular application in which it is used. As an example, in the test run using liquid mercury, the tubular container used has an outside diameter of one inch, a wall thickness of 0.035 inch and a length of 2 feet.

The coil assemblies 14–20 are each physically and electrically identical. As shown in connection with coil assembly 14, the coil assemblies 14–20 each include a coil spool 21 and a wire coil 22. Each spool 21 includes a tubular portion 23 and flange portions 24, 25 extending radially from the ends of the tubular portion 23. The spool material will be determined by the requirements of each application so that it is compatible with the inductance characteristics required of the coil assemblies and the temperature of the liquid. In the tests using mercury and a stainless steel tubular container, porous alumina was found to be a suitable spool material.

The inside diameter of the tubular portion 23 of each spool is sized to closely telescope over the outside surface of the tubular container 13. The spools are preferably of equal height so that the coil assemblies represent equivalent integral units of the total columnar height to be monitored. As an example, in the tests run with the stainless steel tubular container of 2 feet in length, each of the spools 21 were 2 inches in height so as to require 12 coils to completely cover the tubular container 11.

The wire coils 22 are wound on the spools 21 with care to assure that each coil assembly will be as identical as possible in electrical characteristics, particularly their self-inductances. As an example, in the tests run with heated mercury as the liquid, each coil assembly included one thousand turns of wire of a 24 AWG size. The self-inductance of each coil with an air core was determined to be 1.7 millihenrys. A suitable conductor wire is a nickel clad copper with a ceramic insulation. A preferred insulating material for the conductor wire is the ceramic material, because it maintains its insulating qualities for extreme temperatures, e.g. 700° F.

As shown in FIGURE 1, the coil assemblies 14–20 are telescoped over the tubular container 11, so that they are aligned and are co-axial with the tubular container 11. The coil assemblies 15–20 are stacked in abutment between the lower and upper ends 12, 13 of the container 11. The coil assemblies as placed in this closely associated relation provide complete coverage of those portions of the tubular container between the minimum and maximum expected level limits defined by the stacked coil assemblies 15–20. In another embodiment (not shown) the coils 14–20 are stacked within the tubular container and excased within a suitable heat and corrosion resistant material.

One of the coil assemblies is chosen as a reference coil. The self-inductance of the reference coil is compared against the self-inductances of the remaining coils, the latter being designated as testing or sensing coils. The reference coil chosen is one which is in such a position that its self-inductance does not change appreciably for all variations in the height of the liquid column 10. In the preferred arrangement shown, coil assembly 14 is designated as the testing or sensing coil because it is disposed adjacent the upper end 13 of the tubular container 11 and is beyond the reach of the liquid column 10. In other words, except under unusual circumstances, the liquid column will not enter into the columnar space within the confines of the coil assembly 14. The remaining testing coil assemblies 15–20 are placed around those portions of the tubular container 11 which will assure coverage of all variations in the level of the liquid column 10.

Referring now to FIGURE 2, a block diagram of a control system 30 is shown for detecting the level of the liquid column 26 by means of the coil arrangement shown in FIGURE 1. The control system 30 includes an impedance comparator circuit 31 having a first input connected to the reference coil 14 as is indicated by the line 32 and a second input connected to one of the test coils 15–20 (coil 17 being shown as an example) as is indicated by the line 33. The system further includes a control relay circuit 34, an auxiliary relay circuit 35, an indicating relay circuit 36, a rotary stepping switch 37, an interrupter circuit 38, an indicator circuit 39 and a controller circuit 40. The indicator circuit 39 includes indicating lights L1–L6 arranged in a vertical column so as to correspond to the test coil assemblies 15–20 respectively. An incremental indicating meter 111 is included to provide a scale reading of the degree to which any given coil segment is filled.

The function of the control system 30 is to compare the self-inductance of each of the test coils 15–20 to the self-inductance of the reference coil 14. If the self-inductances differ between a test coil and the reference coil 14, then the control system 34 lights the corresponding light in the indicator light circuit 39 to indicate that the liquid column 26 fills the segment of the container 11 within a corresponding coil assembly by more than a predetermined amount. The coils are sequentially compared to the reference coil so that the indicator lights corresponding to the coils which surround container segments filled by the liquid column will be energized to provide a vertical indication of liquid column height. In the example shown in FIGURE 1, the liquid column 10 fills the container segments defined by the test coils 18–20 and part of the test coil 17. Indicator lights L3–L6 corresponding to the coils 17–20 will be energized as long as the liquid level remains within the segments of the container surrounded by the coils 17–20. The system 30 cycles in that it continuously repeats the sequential connection of the test coils to the impedance comparator 31 so that changes in the liquid column level will be detected and indicated by the indicator lights L1–L6.

In the control system of FIGURE 2, the rotary step switch 37 connects the test coils 15–20 one at a time in the sequence of their stacked order to the input of the impedance comparator 31 each time it receives a stepping impulse from the interrupter circuit 38. This is diagrammatically indicated by the line 42. The interrupter circuit 38 is arranged to run continuously until stopped and provides stepping impulses continuously to the rotary step switching circuit 37 as is indicated by the line 43. The impedance comparator 31 compares the self-inductance of each test coil to the reference coil 14. If there is no difference in the self-inductance of the coils, as when there is no liquid within the particular test coil connected, then the impedance comparator 31 provides an appropriate signal to the control relay 34 as is indicated by the line 45. For the purpose of clarity of explanation, this signal will be termed a "YES" or "SAME" signal indicating that the self-inductances of the test and reference coils are the same or nearly so. If the self-inductance of the test coil differs by a predetermined amount from the self-inductance of the reference coil, then the impedance comparator provides a "NO" or "DIFFER" signal to the control relay circuit 34.

Each time the rotary stepping switch 37 connects another test coil to the input of the impedance comparator 31, it also connects another corresponding indicating relay from the indicating relay circuit 36 in an energizing circuit which must be completed by the control relay circuit 34. Line 47 designates this connection between the stepping switch 33 and the indicating relay circuit 36. The relationship between the control relay circuit 34 and the indicating relay circuit 36, as is indicated by the line 49 is such that the control relay circuit finally connects the indicating relay selected by the rotary step switch 37 to an energizing supply if the impedance comparator 31 provides a "DIFFER" signal to the control relay circuit 34 for the particular test coil being examined. In other words, an indicating relay is energized if the self-inductance of the corresponding test coil differs by a predetermined amount from the self-inductance of the reference coil 14. The indicating relay selected from the indicating relay circuit 36 makes an energizing circuit for the indicator light corresponding to the selected test coil and also a holding circuit for maintaining the corresponding light energized, as is indicated by the line 50, if the control relay circuit 34 provides the "DIFFER" signal.

Each time the rotary step switch circuit 37 connects a different test coil to the input of the impedance comparator 31 and a corresponding indicating relay in a circuit for energization, it also connects a corresponding auxiliary relay in a circuit to be energized as is indicated schematically by the line 48.

When energized, an auxiliary relay in the auxiliary relay circuit 35, breaks the holding circuit for the corresponding indicating relay in relay circuit 36 through the line 51. Energization of the selected corresponding auxiliary relay in the relay circuit 35 is controlled by the control relay circuit 34 as indicated schematically by the line 52. The control relay circuit 34 connects the auxiliary relay circuit 35 to an energizing supply each time the control relay receives a "SAME" signal from the impedance comparator indicating there is no difference betwen self-inductances of the test coil and the reference coil. Thus, if the self-inductance of the test coil does not differ from the reference coil, then the auxiliary relay corresponding to the selected test coil is energized and breaks the holding circuit for the indicator light for that particular test coil. As the system cycles, it is continuously rechecking the liquid level and energizing those lights necessary to indicate new higher levels of the liquid or deenergizing the lights necessary to show drops in the level of the liquid 10.

The interrupter circuit 38 is also connected to the control relay circuit 34 as is indicated by the line 53. The interrupter circuit permits the control relay circuit 34 to connect or disconnect the energizing circuits for the auxiliary relays in circuit 35 and for the indicator relays in circuit 36 after it provides a stepping impulse to the rotary step switch 37. This assures that the relays in the indicator and auxiliary relay circuits 36, 35 will not be energized until after the selected test coil is connected to the impedance comparator 31.

The auxiliary controller circuit 40 is connected to the indicator relay circuit 36. The auxiliary controller circuit 40 provides for further control of equipment associated with the present liquid level sensing apparatus. The auxiliary controller is operated by suitable control elements in the indicator relay circuit 36, e.g., the contacts of the indicator relays.

Figures 3, 4:
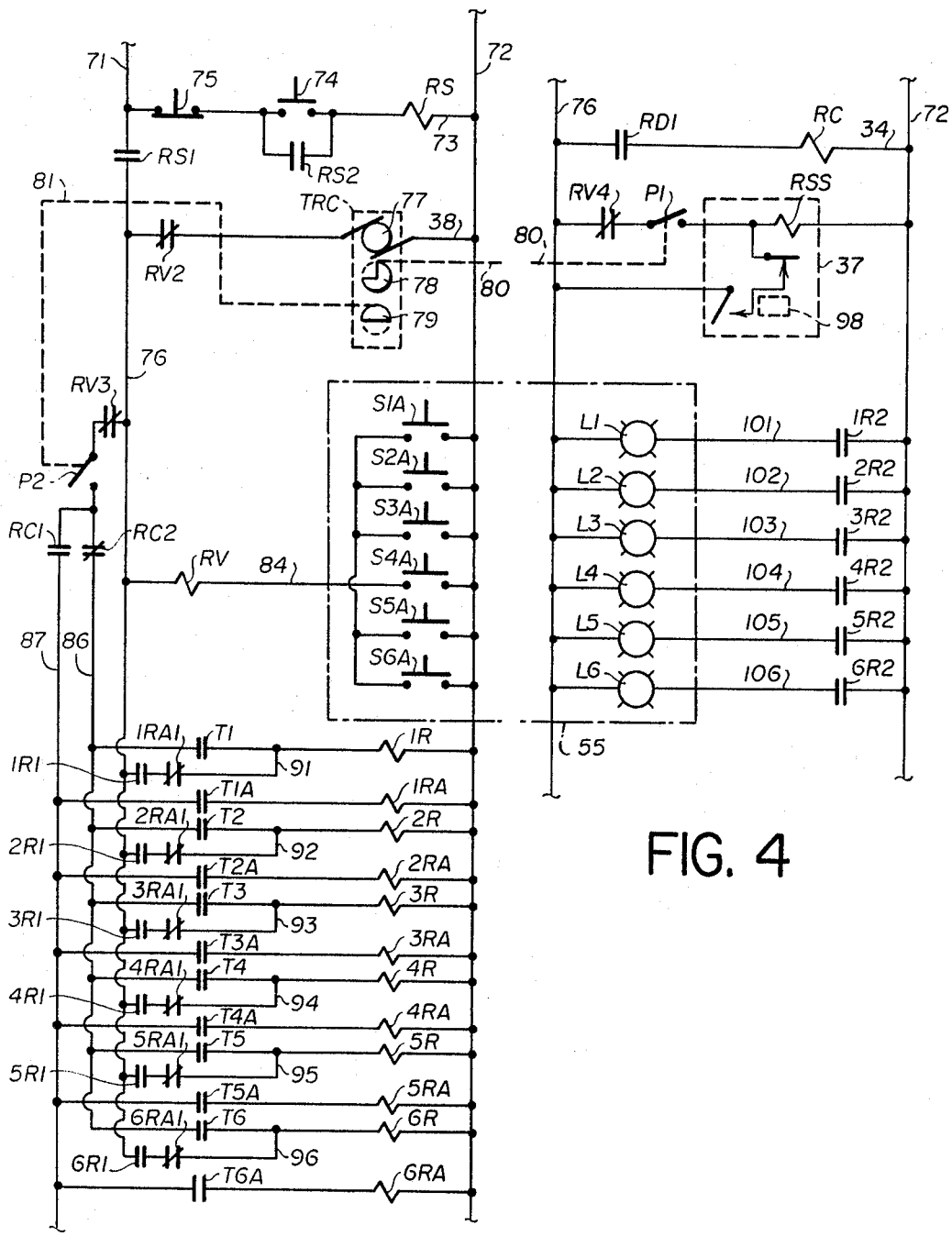
FIGURES 3–5 are across-the-line diagrams of a specific embodiment of the control system shown in FIGURE 2.
Figure 5:
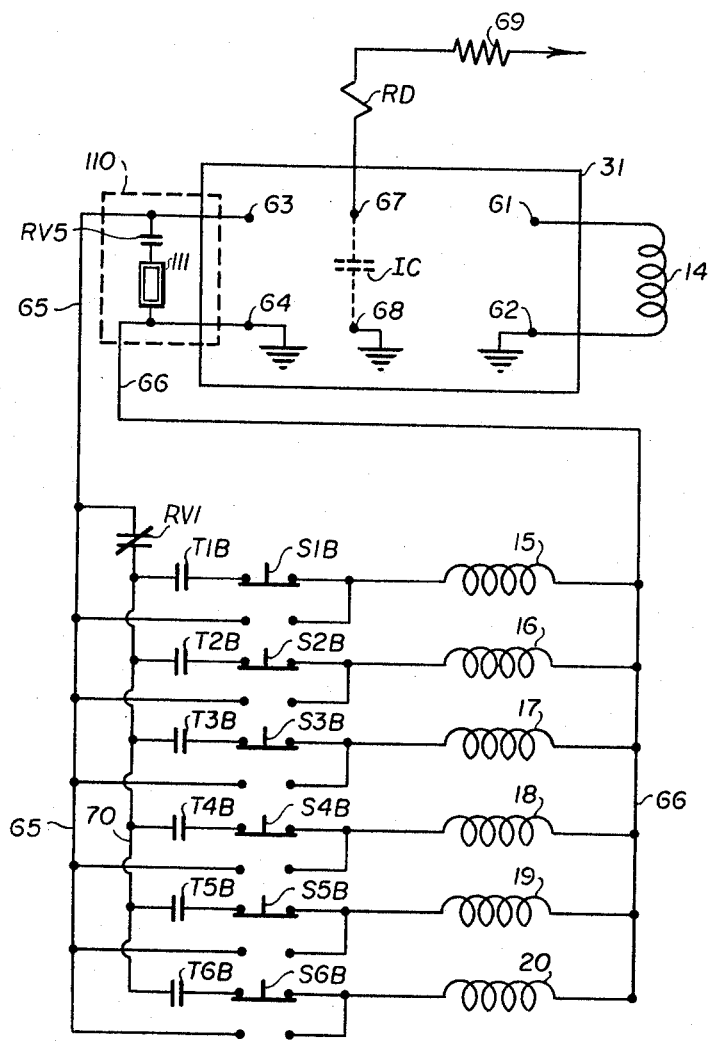

Referring now to FIGURES 3–5, a specific illustration of the control system 30 is shown in detail. Wherever practicable, conventional electrical nomenclature for across-the-line diagrams has been used to designate the elements of the control system 30 to assure simplicity of illustration. In FIGURE 5, the impedance comparator 31 includes first input terminals 61, 62 connected to the reference coil 14, second input terminals 63, 64 connected to conductors 65, 66 for connecting the test coils 15–20 sequentially to the comparator 31. Internally, the comparator 31 includes a normally open switch contact IC (indicated in broken lines) connected between output switching terminals 67, 68. The switching terminal 67 is connected to a relay coil RD which in turn is connected to a 250 volt supply through a resistor 69. Each time the self-inductance of one of the test coils 15–20 connected across the conductors 65, 66 does not differ from the self-inductance of the test coil 14, the impedance comparator 31 closes its normally open contact IC to energize the relay coil RD and to provide the "SAME" signal.

The impedance comparator compares the inductances of the coils by imposing an audio frequency voltage across the reference and test coils and determines any differences in the inductances by means of a null-balance. If there is a null-balance, then it closes its contacts IC to energize the relay coil RD. There is an optimum frequency at which the comparison of the coils should be carried out. This optimum frequency must be determined for each particular application and depends on the physical dimensions of the coil inductors 14–20, the diameter and wall thicknesses of the tubular container 11. One suitable impedance comparator usable in the control system 30 is model 1605A by General Radio Corporation. The optimum frequency used in the operational tests run with liquid mercury was 10 kilocycles.

Each of the test coils 15–20 has one side connected to the secondary input conductor 66. The other sides of the test coils 15–20 are connectable to a conductor 70 via the normally closed contacts of push button switches S1B to S6B and normally open contact T1B through T6B. The test coils are connected to conductor 65 via the conductor 70 which is connected to the secondary input conductor 65 through a normally closed contact RV1.

Referring to FIGURE 3, a pair of supply lines 71, 72 are connected to a suitable 120 volt alternating current source for providing power to the control system 30. A starting circuit 73 is connected across the supply conductors 71, 72. The starting circuit 73 includes a starting relay coil RS, normally open start contact 74 and a normally closed stop contact 75 in series. A normally open contact RS2 operated by the relay coil RS is connected in parallel with the start switch 74 to provide a maintaining circuit for the starting circuit 73. A normally open contact RS1 operated by the starting relay RS is provided for connecting a holding circuit supply conductor 76 to the supply conductor 71 when the coil RS is energized.

The interrupter circuit 38 is connected across the supply line 72 and the holding supply line 76 and includes a normally closed contact RV2 and motor circuit 77 of a timer TRC. The timer TRC has a one second repeating cycle and is equipped with two (four notch) break out cams 78, 79 to provide possible one quarter second closures. A suitable timer is a Hagen Model No. 72. As shown by the broken lines 80, 81, the cams 78, 79 operate normally open contacts P1, P2. The cam 78 has one notch broken out so that it closes the contact P1 for one quarter second out of each one second repeating cycle. The cam 79 has two adjacent notches broken out so that it closes the open switch contact P2 for one-half second out of each one second repeating cycle. The break out portions removed from the cams 78, 79 are such that the cam 79 closes the contact P2 for one-half second and the cam 78 closes the contact P1 for a quarter second as the contact P2 is opening when the timer TRC is operating. This may be seen by imagining that the cams are rotating in a counterclockwise direction. The timer, when connected across the supply lines 71, 72 is running continuously causing the cams 78, 79 to make one complete cycle each second so that the contact P2 is closed for a half second, the contact P1 is closed for the next quarter second, and both contacts P1, P2 are open for the final quarter second.

An incremental liquid level readout control circuit 84 is connected across the supply lines 72, 76 and includes a relay coil RV in series with parallel connected normally open contacts of push button switches S1A–S6A. The normally open push button switches S1A–S6A are mechanically interlocked with the push button switches S1B through S6B so that when one of the push button switches S1A–S6A are closed, a corresponding push button S1B–S6B is moved to open its normally closed contact and close its normally open contact.

An indicator relay supply circuit conductor 86 is connectable to the supply conductor 76 via a normally closed contact RC2, the normally open contact P2 and a normally closed contact RV3. An auxiliary relay supply circuit conductor 87 is connectable to the supply line conductor 76 through a normally open contact RC1, the normally open contact P2, and the normally closed contact RV3.

A plurality of auxiliary relay circuits having auxiliary relays 1RA–6RA are connected through normally open contacts T1A–T6A from the supply conductor 72 to the auxiliary relay supply circuit conductor 87. A plurality of indicating relay circuits having indicating relays 1R–6R are connected from the supply line 72 to the indicator supply circuit conductor 86 through normally open contacts T1–T6 respectively. The indicating relay circuits include holding circuit conductors 91–96 respectively which are connected from between the indicating relays 1R–6R and the normally open contacts T1–T6 to the holding supply circuit conductor 76. The holding circuits 91–96 include normally open indicating relay contacts 1R1–6R1 and normally closed auxiliary relay contacts 1RA1–6RA1 respectively.

A continuation of the control circuit 30 is shown in FIGURE 4. The control relay circuit 34 is connected across the supply lines 72, 76 and includes control relay coil RC and normally open contact RD1 which is operated by the relay RD in the impedance comparator output circuit.

The rotary stepping switch 37 is connected across the supply lines 72, 76 and includes a normally closed contact RV4 operated by the incremental readout relay RV, the normally open pulsing contact P1, and the stepping solenoid RSS of the rotary stepping switch 37. The rotary stepping switch 37 has the contacts T–T6, T1A–T6A and T1B–T6B arranged in three contact banks respectively so that corresponding contacts in each bank are being simultaneously closed as the stepping switch is caused to cycle by stepping impulses energizing the stepping solenoid RSS. In other words, during the stepping process, the first bank of contacts T1–T6 which are non-bridging contacts, steps T1 through T6 and then returns to contact T1 by way of an OFF normal spring arrangement 98. Simultaneously, the bank of contacts T1A–T6A, which are also non-bridging contacts, steps T1A through T6A and then returns to T1A by way of the same OFF normal spring 98. Again simultaneously, the third bank of contacts T1B through T6B and then returns to T1B by way of the OFF normal spring 98. A suitable stepping switch is an Automatic Electric type 45 with IBIC interrupter spring and 2C OFF normal spring.

A plurality of indicator circuits 101–106 are connected across the supply lines 72–76. The indicator circuits 101–106 include the indicator lights L1–L6 in series with normally open contacts 1R2–6R2 respectively. Each of the indicator lights L1–L6 is opposite a corresponding push-button S1A–S6A on an indicator panel designated by the broken lines 55. The indicator lights L1–L6 are preferably arranged in a vertical column in closely adjacent relation on the panel 55. The indicator lights are covered or otherwise made opaque except for vertical translucent lines of bright color, e.g., red. The lines of all the indicator lights are aligned and form a continuous indicator line which graphically depicts a liquid column. Preferably, the numbers 1–6 are inscribed on the indicator lights L1–L6, respectively.

Referring to FIGURE 5, an incremental readout meter circuit 110 is connected across the secondary input conductor 65, 66 and includes a normally open contact RV5 and an incremental liquid level readout meter 111. The meter 111 provides a scale reading in terms of the degree to which each coil segment of the tubular container 11 is filled with liquid. Preferably, the incremental readout meter is a vertical meter, a volt meter in the arrangement shown, suitably connected to the control system to provide a scale reading in terms of the degree to which a testing coil assembly segment of the tubular container is filled with liquid.

*Operation*

Operation of the interrupter circuit 38 is initiated by closing the start switch 74 to energize the start relay coil RS. The energized relay coil RS closes its contacts RS1, RS2. RS2 seals the start switch 74. The closed contact RS1 connects the supply circuit conductor 76 to supply circuit conductor 71. The timer motor 77 is energized and begins rotating the cams 78, 79 in a counterclockwise direction.

Initially, the number one contacts T1, T1A, T1B in the three contact banks of the stepping switch 37 are closed. The closed T1B contact connects the test coil 15 to the secondary input terminals 63, 64 of the impedance comparator 31. If the liquid is not within the segment of the tubular container 13 within coil 15 then the self-inductance of the coil 15 does not differ from the self-inductance of the coil 14 and the impedance comparator contact IC closes to energize the relay coil RD. The relay coil RD closes its contact RD1 in the control relay circuit 34 to energize the control relay RC. The control relay RC closes its contact RC1 in the auxiliary relay supply conductor 87, opens its contact RC2 in the indicator relay supply circuit conductor 86. The closed contact RC1 permits the auxiliary relay coil 1RA to be energized through the closed contact T1A as soon as contact P2 closes. The auxiliary relay coil 1RA opens its contact 1RA1 which would break the holding circuit 91 for the indicating relay 1R had the indicating relay been energized and held during a previous scanning cycle. The cam 79 rotates one quarter turn and closes the normally open contact P2 for one-half second.

The open contact RC2 prevents the indicating coil 1R from being energized through the now closed contacts T1 and P2. The indicating relay coil 1R not being energized, does not close its contact 1R2 in the indicator light circuit 101 so that the indicator light L1 remains de-energized.

If the liquid 10 fills the segment of the tubular container 13 within the test coil 15 by more than a predetermined amount, so that the self-inductance of the test coil 15 differs from that of coil 14, then the impedance comparator contact IC remains open and the coil RD remains de-energized. The control relay circuit 34 is not energized and the contacts RC1 and RC2 remain opened and closed, respectively. The contact T1 is in its initial closed condition and the indicating relay coil 1R is connected across the supply lines 71, 72 for the half second period that the pulsing contact P2 is closed by the interrupter circuit 38. The indicating relay coil 1R closes its contacts 1R1 and 1RA. The closed contact 1R2 completes the indicator light circuit 101 and energizes the indicator light L1. The contact 1R1 closes to form a holding circuit for the indicator relay coil 1R across the conductors 76, 72 so as to maintain the indicator light L1 energized since the auxiliary relay coil 1RA cannot be energized to open its contact 1RA1 through the open contact RC1.

At the termination of the one-half second closure period for the pulsing contact P2, the cam 79 opens the contact P2 as the cam 78 closes the pulsing contact P1. The closed pulsing contact P1 thus places the stepping solenoid RSS across the supply conductor 76, 72 and the rotary stepping switch steps its three banks of contacts to their next numerical or sequential position so that contacts T1, T1A, T1B open and contacts T2, T2A, T2B close. The contacts T2B connect testing coil 16 across the comparator input terminals 63, 64 for comparison with the reference coil 14.

The system pauses for a quarter of a second until the cam 79 again closes the pulsing contact P2. During the quarter second pause, the impedance comparator is comparing the impedance of the selected coil to the impedance of the reference coil 14. If the self-inductance of the test coil differs from that of the reference coil 14, then the impedance comparator contact IC remains open and the indicating relay 2R is energized to energize the corresponding indicator light L2 and close its holding circuit 92 as soon as contact P2 closes. If the self-inductance of the test coil does not differ from that of the reference coil 14, then the indicating relay 2R is not energized and the indicator light L2 remains dark. The contacts T1B–T6B are bridging contacts. In other words, the previous closed contact e.g., T1B, opens after the succeeding contact, e.g., T2B, closes. The testing coils are thus inserted or connected to the secondary input terminals 63, 64 of the impedance comparator by a "make-before-break" contact arrangement which avoids transient current surges.

As long as the starting circuit 73 is closed, the timer continues to run stepping the rotary stepping switch 37 every second to sequentially compare the test coils 15–20 to the reference coil 14. For each segment of the container tube 13 filled or at least partially filled by the liquid 10, a corresponding indicating relay 1R–6R is energized to energize a corresponding indicator light L1–L6 so that the height of the liquid column can be determined by viewing the indicator lights L1–L6. The scanning cycle performed by the stepping switch 37 repeats continuously as long as the starting circuit 73 is closed.

Each time the scanning cycle is repeated, the testing coils 15–20 are again examined and if the level of the liquid has changed during the interim, the indicator lights L1–L6 will remain energized or be de-energized accordingly. For example, if during one scanning cycle, it is determined that the liquid level is within the coils 17, 20 and on a subsequent scanning cycle it is determined that the liquid level has dropped to within the test coils 18–20 only, then the indicator light L3 corresponding to coil 17 will be de-energized on a subsequent scanning cycle and the indicator lights L4–L6 corresponding in the testing coils 18–20 will remain energized. The indicator light L3 is de-energized on the subsequent scanning cycle because when the coil 17 is again compared to the reference coil 14, their self-inductances are substantially the same and the impedance comparator contact IC closes energizing relay coil RD which closes its contact RC1 and the contact RC2 opens. The auxiliary relay supply circuit conductor 87 then connects the auxiliary relay coil 3RA across the supply lines 71, 72 through the now closed contact T3A to open its contact 3RA1 in the holding circuit 94 which was closed on the previous scanning cycle when the liquid column was disposed within the coil 17. The holding circuit for the relay coil 3R having been broken, its contact 3R2 opens and de-energizes the indicator light L3.

Should it be desired to examine the exact level of the liquid column within a particular segment of the tubular container 11, the scanning cycle is stopped by selecting the push button which corresponds to that segment. For example, if it is desired to determine the exact height of the liquid column within the testing coil 17, then the push button S3A is pushed to close its normally open contacts which opens the normally closed contacts of the mechanically interconnected push button switch S3B and closes the normally open contacts of the latter switch. Closing the push button switch S3A energizes the incremental readout relay RV and it opens its contacts RV1, RV2, RV3, and RV4, and closes its contacts RV5. The open contacts RV1 disconnect the conductor 70 from the conductor 65 in the testing coil circuits shown in FIGURE 5. The open contact RV2 de-energizes the interrupter circuit 38 so that the timer TRC stops. The open contact RV3 assures disconnection of the auxiliary relay supply circuit conductor 87 and the indicator relay supply circuit conductor 86 from the main supply conductor 71. The opened contact RV4 assures disconnection of the rotary stepping switch 37 during the incremental readout. The closed contact RV5 connects the incremental readout meter 111 across the coil 17 via the now closed normally open contacts of the push button switch S3B and the circuit conductors 65, 66. The scale of the meter 111 then gives a reading in terms of the degree to which the liquid level fills the coil 17. Thus, the scanning cycle can be stopped at any time to determine the degree to which any particular segment of the tubular container 11 is filled by depressing the push button which corresponds to that segment.

The present invention is thus believed to have several advantages. The inductor coils 14–20 are not required to penetrate into the containing vessel but can be placed around an outside surface or entirely within the vessel if desired. The plurality of stacked inductor coils provides good resolution. In the tests involving mercury, one-eighth inch changes in the mercury level were easily detected. The response time of the incremental indicator to changes in liquid level was extremely fast and nearly instantaneous with mercury level changes in the liquid column.

The system may be used with very high temperature liquid metals. The maximum temperature of the system is probably limited only by the materials used in the inductance coils. The use of the plurality of test coil inductors provides for wide spans in detectable level changes and also affords reliable interlocking with other systems for further control purposes. The inductance coils also form a heat insulator or barrier around the container and do not contact the liquid. Finally, the system is relatively insensitive to influctuations in the temperature of the liquid.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. An apparatus comprising:
   (a) a tubular member defining an elongated fluid receiving cavity;
   (b) a plurality of inductive coils disposed around and along said cavity with each coil surrounding different portions of the cavity; and,
   (c) impedance comparison means selectively connectable to each of the coils to measure the inductance in each coil and to compare the inductive characteristics thereof with a constant reference so as to indi- cate the presence of conductive or non-conductive fluid in the cavity.

2. An apparatus comprising:
(a) a tubular member defining an elongated fluid receiving cavity;
(b) a plurality of sensing coils disposed around and along said cavity with each sensing coil surrounding a different test portion of said cavity so that the inductance of each coil is affected by the conductivity of the fluid within its portion of the cavity;
(c) a reference coil surrounding a reference portion of said cavity wherein the conducivity of the fluid within the reference portions of the cavity remains substantially constant relative to the conductivity of the fluid within said test portions of the cavity; and,
(d) impedance comparison means connected to said reference coil and being selectively connectable to said sensing coils individually to compare the inductive characteristics of said sensing coils to said reference coils and thereby sense changes in the conductivity of fluid in each of the test portions of the cavity.

3. A fluid level indicating apparatus comprising:
(a) a tubular member defining an elongated fluid receiving cavity;
(b) a plurality of sensing devices disposed along said cavity and being operatively associated with different portions of said tubular member so that the inductive characteristic of each device is affected by the conductivity of the fluid within the cavity defined by its portion of the tubular member;
(c) one of the sensing devices being operatively associated with a portion of said tubular member such that the conductivity of the fluid within the cavity defined by its portion of the tubular member remains substantially constant; and,
(d) comparison means connected to said sensing devices and comparing the inductive characteristics of said one device selectively to the inductive characteristic of the other devices whereby the level of conductive fluid within the cavity is determined.

4. A fluid level indicating apparatus comprising:
(a) a tubular member defining an elongated fluid receiving cavity;
(b) a plurality of sensing devices disposed along said cavity and being operatively associated with different portions of said tubular member so that the inductive characteristic of each device is affected by the conductivity of the fluid within the cavity defined by its portion of the tubular member;
(c) one of the sensing devices being operatively associated with a portion of said tubular member such that the conductivity of the fluid within the cavity defined by its portion of the tubular member remains substantially constant;
(d) induntance comparison means connected to said sensing devices and comparing the inductive characteristics of said one sensing device to the inductive characteristics of said other sensing devices; and,
(e) indicator means having a plurality of indicator outputs corresponding to said other sensing devices, said indicator means being operatively responsive to said comparison means and providing a first signal indication at its outputs corresponding to those other sensing devices having inductive characteristics similar to said one sensing device and a second signal indication at its outputs corresponding to those other sensing devices having inductive characteristics differing from said one sensing device.

5. An apparatus for determining fluid level comprising:
(a) an elongated tubular container having an elongated cavity for receiving the fluid wherein the fluid forms a column having an interface between upper and lower ends of the tubular container;
(b) a plurality of inductance coils disposed around the cavity defined by the tubular container, said coils being disposed in closely adjacent relation so that adjacent coils correspond to adjacent segments of the cavity;
(c) the inductance of each coil when the cavity segment within the coil is empty differing substantially from the inductance of the coil when the fluid column fills the cavity segment within the coil beyond a predetermined amount;
(d) one of the coils being disposed around a portion of the tubular container whose cavity segment has a constant filled fluid condition, said one coil comprising a reference coil;
(e) an inductance comparator having first and second inductance comparison inputs and a signal output, said reference coil being connected to one of said inductance comparison inputs;
(f) switching means sequentially connecting the other of said coils as test coils to the second inductance comparison input, the inductance comparator comparing the inductance of each test coil to the inductance of the reference coil and providing an inductance difference signal if the inductance of the connected test coil differs from the inductance of the reference coil by a predetermined inductance and an inductance same signal if the inductances of the compared coils do not differ by a predetermined inductance; and,
(g) indicator means having a plurality of indicators corresponding to the test coils, said indicator means being connected to the output of the inductance comparator and energizing the indicator corresponding to the connected coil if an inductance difference signal is received from the output of the inductance comparator.

6. An apparatus for determining fluid level comprising:
(a) an elongated tubular container having an elongated cavity for receiving the fluid wherein the fluid forms a column having an interface between upper and lower ends of the tubular container;
(b) a plurality of inductance coils disposed around the cavity defined by the tubular container, said coils being disposed in closely adjacent relation so that adjacent coils correspond to adjacent segments of the cavity;
(c) the inductance of each coil when the cavity segment within the coil is empty differing substantially from the inductance of the coil when the fluid column fills the cavity segment within the coil beyond a predetermined amount;
(d) one of the coils being disposed around a portion of the tubular container whose cavity segment has a constant filled fluid condition, said one coil comprising a reference coil;
(e) an inductance comparator having first and second inductance comparison inputs and a signal output, said reference coil being connected to one of said inductance comparison inputs;
(f) switching means sequentially connecting the other of said coils as test coils to the second inductance comparison input, the inductance comparator comparing the inductance of each test coil to the inductance of the reference coil and providing an inductance difference signal if the inductance of the connected test coil differs from the inductance of the reference coil by a predetermined inductance and an inductance same signal if the inductance of the compared coils do not differ by a predetermined inductance;
(g) indicator circuit means having a plurality of indicators, one corresponding to each of said test coils;
(h) said switching means connecting said indicators in an energizing circuit as its corresponding test coil is connected to the second inductance comparison input of the inductance comparator; and, (i) a control circuit means connected to the output of the inductance comparator and the indicator circuit means, said control circuit means completing the energization circuit for the connected indicator when the inductance comparator provides the inductance difference signal at its output.

7. An apparatus for determining fluid level comprising:
(a) an elongated tubular container having an elongated cavity for receiving the fluid wherein the fluid forms a column having an interface between upper and lower ends of the tubular container;
(b) a plurality of inductance coils disposed around the cavity defined by the tubular container, said coils being disposed in closely adjacent relation so that adjacent coils correspond to adjacent segments of the cavity;
(c) the inductance of each coil when the cavity segment within the coil is empty differing substantially from the inductance of the coil when the fluid column fills the cavity segment within the coil beyond a predetermined amount;
(d) one of the coils being disposed around a portion of the tubular container whose cavity segment has a constant filled fluid condition, said one coil comprising a reference coil;
(e) an inductance comparator having first and second inductance comparison inputs and a signal ouput, said reference coil being connected to one of said inductance comparison inputs;
(f) switching means sequentially connecting the other of said coils as test coils to the second inductance comparison input, the inductance comparator comparing the inductance of each test coil to the inductance of the reference coil and providing an inductance difference signal if the inductance of the connected test coil differs from the inductance of the reference coil by a predetermined inductance and an inductance same signal if the inductances of the compared coils do not differ by a predetermined inductance;
(g) a plurality of indicator lights arranged in a column and corresponding to the test coils around adjacent cavity segments respectively;
(h) an indicator relay circuit having a plurality of indicator relays corresponding to the plurality of test coils and to the corresponding indicator lights respectively, said indicator relays connecting their corresponding indicator lights in an energizable circuit when actuated;
(i) said switching means being connected to the indicator relay circuit means and sequentially actuating the indicator relay corresponding to the test coil connected sequentially to the second inductance comparison input; and,
(j) control circuit means connected to the output of the inductance comparator and to the indicator relay circuit and completing the energizing circuit for the connected indicator light when the corresponding test coil inductance differs from the inductance of the reference coil and the inductance comparator provides an inductance difference signal on its output to the control circuit means.

8. The apparatus of claim 7 including:
(k) said indicator relay circuit means including a plurality of holding circuits corresponding to the plurality of indicating relays so as to maintain a completed energizing circuit for an indicator light.

9. The apparatus of claim 8 including:
(l) an auxiliary relay circuit having a plurality of auxiliary relays connected to corresponding ones of the holding circuits in the indicating relay circuit;
(m) said switching means sequentially connecting the auxiliary relay in energizing circuits as it sequentially connects the corresponding test coils to the second inductive comparison input of the impedance comparator; and,
(n) said control circuit means being connected to the auxiliary relay circuit means and completing the energizing circuit for a connected auxiliary relay when the inductance comparator provides an inductance same signal on its output whereby the auxiliary relay energized breaks the corresponding holding circuit if previously established.

10. The apparatus of claim 9 including:
(o) interrupter circuit means connected to the switching means and providing stepping impulses to the switching means whereby the switching means continues to cycle the sequential connections of the coils, the indicating relays and the auxiliary relays as long as said stepping impulses are provided to the switching means.

11. The apparatus of claim 10 including:
(p) said interrupter circuit means being connected to said control relay means and permitting the control relay means to complete the energizing circuits for the indicating relays and auxiliary relays only after a corresponding test coil has been connected to the inductance comparator.

12. The apparatus of claim 11 wherein the indicator lights are arranged in a vertical column in closely adjacent relation whereby the illuminated lights blend and pictorially represent the fluid column within the tubular container.

13. The apparatus of claim 11 including:
(q) incremental readout circuit means having a plurality of switches corresponding to the plurality of test coils and to the indicator lights respectively, said switches being connected to said test coils and connecting said test coils to an incremental readout meter when actuated; and,
(r) said incremental readout meter having a readout scale providing an indication of the proportion to which the fluid column fills the particular segment surrounded by the corresponding coil by measuring proportional changes in the inductive characteristics of that coil.

14. The apparatus of claim 13 wherein said incremental readout circuit means further includes:
(s) disconnect relay means connected to the switching means, the test coils, the control circuit means, the auxiliary circuit means, the indicating circuit means and the interrupter circuit to stop the operation of all of the latter whenever one of the incremental readout switches is actuated.

References Cited

UNITED STATES PATENTS 3,154,946 11/1964 Ordorica _____ 73—313
3,157,048 11/1964 Williams _____ 73—304

LOUIS R. PRINCE, *Primary Examiner.*

S. C. SWISHER, *Assistant Examiner.*